(12) United States Patent
Furuta et al.

(10) Patent No.: US 9,046,059 B2
(45) Date of Patent: Jun. 2, 2015

(54) ELECTRIC VEHICLE AND FAULT DETECTION METHOD FOR EXHAUST GAS RECIRCULATION SYSTEM OF INTERNAL COMBUSTION ENGINE

(75) Inventors: Katsuhiro Furuta, Okazaki (JP); Hideo Matsunaga, Okazaki (JP); Hitoshi Kamura, Okazaki (JP); Kenji Saito, Nagoya (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 316 days.

(21) Appl. No.: 13/618,101

(22) Filed: Sep. 14, 2012

(65) Prior Publication Data
US 2013/0085653 A1 Apr. 4, 2013

(30) Foreign Application Priority Data
Oct. 4, 2011 (JP) .................. 2011-219965

(51) Int. Cl.
| | |
|---|---|
| F02D 41/22 | (2006.01) |
| F02M 25/07 | (2006.01) |
| B60W 20/00 | (2006.01) |
| F02D 41/00 | (2006.01) |
| B60K 6/442 | (2007.10) |
| B60K 6/52 | (2007.10) |
| B60W 10/06 | (2006.01) |
| F02D 41/02 | (2006.01) |

(52) U.S. Cl.
CPC ........... *F02M 25/0702* (2013.01); *B60W 20/00* (2013.01); *F02D 41/022* (2013.01); *F02D 41/0055* (2013.01); *F02D 2200/0406* (2013.01); *Y02T 10/47* (2013.01); *B60Y 2400/442* (2013.01); *B60K 6/442* (2013.01); *B60K 6/52* (2013.01); *B60W 10/06* (2013.01); *B60W 2510/0604* (2013.01); *B60W 2510/0671* (2013.01); *B60W 20/50* (2013.01); *Y02T 10/6234* (2013.01); *Y02T 10/6265* (2013.01)

(58) Field of Classification Search
CPC . F02D 41/0052; F02D 41/22; F02D 41/0055; F02D 41/022; B60W 20/50; B60W 10/06
USPC .............................. 123/568.16; 701/107, 108
See application file for complete search history.

(56) References Cited

U.S. PATENT DOCUMENTS 5,474,051 A * 12/1995 Matsumoto et al. ..... 123/568.16
2010/0076635 A1 3/2010 Sugimoto

FOREIGN PATENT DOCUMENTS

| JP | 9-144609 A | 6/1997 | |
|---|---|---|---|
| JP | 2007-239468 A | 9/2007 | |
| JP | 4274266 B2 | 6/2009 | |
| JP | 2010-174728 A * | 8/2010 | .............. F02D 41/04 |
| JP | 2010-196684 A | 9/2010 | |

* cited by examiner

*Primary Examiner* — Hai Huynh
(74) *Attorney, Agent, or Firm* — Birch, Stewart, Kolasch & Birch, LLP

(57) ABSTRACT

An electric vehicle includes engine in which the amount of fuel supply is controlled by a throttle, a generator that produces electricity using the power of the engine, a motor outputs power to a drive shaft, an EGR system that supplies gas, exhausted from the engine, to a manifold of the engine, a clutch that switches between the transmission and the non-transmission of power from the engine to the drive shaft, a sensor that measures the change of a pressure of the manifold before and after the EGR system supplies the gas to the manifold, and ECU that performs fault detection of the EGR system using the sensor when conditions, where a series mode is selected, the degree of opening of the throttle is constant, are satisfied.

4 Claims, 4 Drawing Sheets

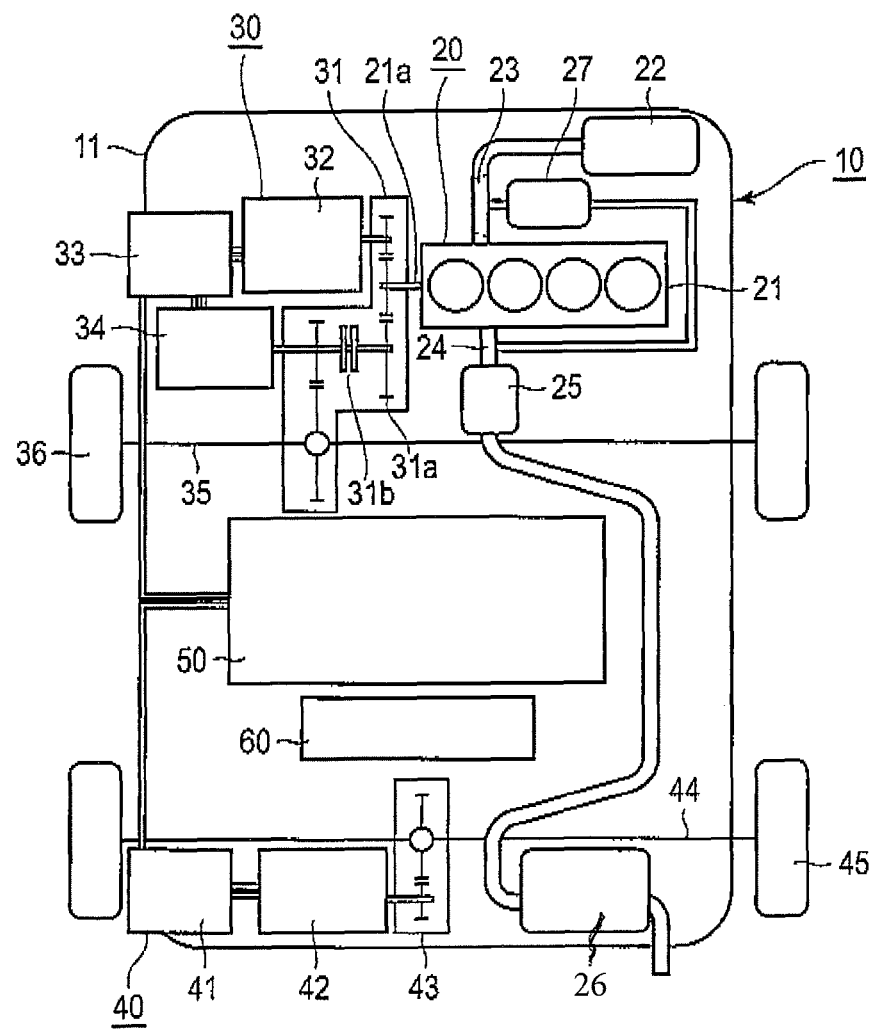
F I G. 1

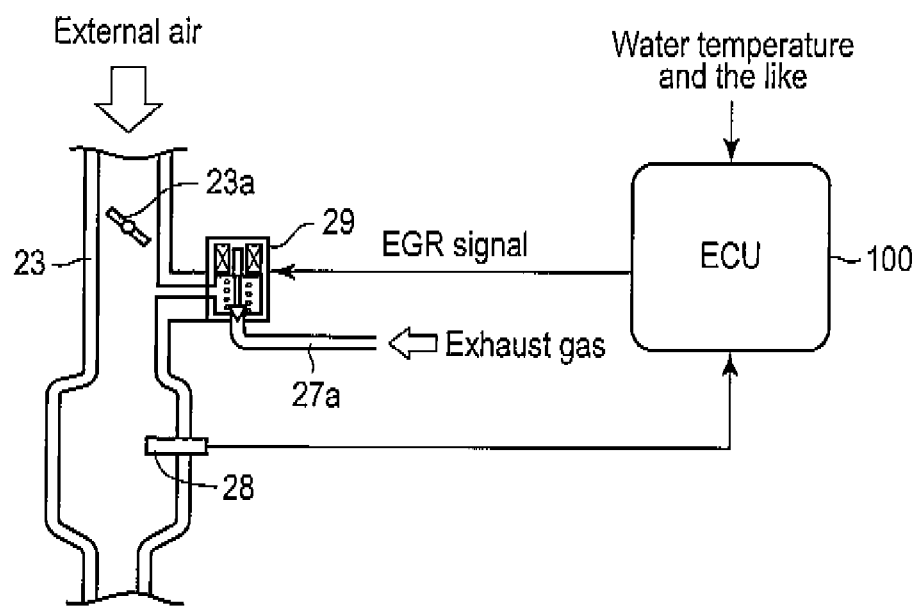
F I G. 2

ELECTRIC VEHICLE AND FAULT DETECTION METHOD FOR EXHAUST GAS RECIRCULATION SYSTEM OF INTERNAL COMBUSTION ENGINE

CROSS-REFERENCE TO RELATED APPLICATIONS

This application is based upon and claims the benefit of priority from prior Japanese Patent Application No. 2011-219965, filed Oct. 4, 2011, the entire contents of which are incorporated herein by reference.

BACKGROUND OF THE INVENTION

1. Field of the Invention

The present invention relates to an electric vehicle, in which motive power from an internal combustion engine is supplemented by electric traction, and a fault detection method for an exhaust gas recirculation system of the internal combustion engine used for the electric vehicle.

2. Description of the Related Art

In vehicles which use an internal combustion engine such as a gasoline engine as a source of motive power, an exhaust gas recirculation (EGR) system, in which some of the engine exhaust gas is recirculated to an intake system to lower the maximum temperature of combustion and reduce the production of $NO_X$, is known as a device for reducing $NO_X$ in engine exhaust. If a desired amount of exhaust gas recirculation is not obtained because of a fault in the engine gas recirculation system, the amount of exhaust $NO_X$ may increase. On the other hand, if the amount of exhaust gas recirculation excessively exceeds a desired amount, motive power deteriorates because of a significant deterioration in combustion, and the amount of exhaust products such as HC, CO, and black smoke, may greatly increase. Therefore, an EGR system equipped with a fault detection device capable of detecting whether or not exhaust gas recirculation is being performed properly is known.

In such a fault detection device, by opening and closing an EGR valve while the internal combustion engine is running, the change in negative pressure in the intake manifold is measured before and after opening and closing. If the value thereof is in a predetermined range, exhaust gas recirculation is determined to be normal, and if the value thereof is not in a predetermined range, exhaust gas recirculation is determined to be abnormal.

When the EGR valve is opened and closed during normal operation, torque shock occurs because of combustion fluctuation and thus motive power deteriorates. Therefore, a technique is known in which fault detection is performed while fuel supply is cut during deceleration and thus toque shock or the like is suppressed as compared to a case where fault detection of an exhaust gas recirculation system is performed during normal operation (for example, Jpn. Pat. Appln. KOKAI Publication No. 9-144609).

In recent years, an electric vehicle in which an internal combustion engine and an electric motor are used in conjunction as a source of motive power, that is, a hybrid vehicle has been put into practical use. During deceleration, such an electric vehicle may be propelled only by the power of the electric motor, by cutting the fuel supply to the internal combustion engine and eventually stopping the internal combustion engine. Therefore, if fault detection is attempted while fuel supply is cut during deceleration, the rotation of the internal combustion engine is stopped before completing the fault detection. As a result, there may be a case where a sufficient opportunity to perform fault detection of an exhaust gas recirculation system is not secured.

In order to solve the above-described problems, a technique is known in which, when fault detection starts while the fuel supply to an internal combustion engine is cut during deceleration, even though the cutting of fuel supply is finished and conditions for stopping the rotation of the internal combustion engine are satisfied, the turning over (constrained rotation) of the internal combustion engine is performed by an electric motor until a predetermined fault detection is completed, to generate a negative pressure in an intake manifold and thereby to continue the fault detection (for example, Jpn. Pat. No. 4274266). Accordingly, a sufficient opportunity to perform fault detection of an exhaust gas recirculation system can be secured.

BRIEF SUMMARY OF THE INVENTION

The above-described EGR fault detection method has the following problems. That is, when fault detection is performed during the normal operation of an internal combustion engine, there is a problem in that torque shock occurs and motive power deteriorates. In addition, in a case where fault detection is performed while fuel supply is cut, when an internal combustion engine is stopped, there is a problem in that the fault detection is stopped and the number of times of fault detection decreases. Furthermore, in order not to stop fault detection, when the electric motor is turning over the internal combustion engine after the internal combustion engine has stopped, there is a problem that the energy drain on the battery is great.

To that end, according to aspects of the invention, objects thereof are to provide a hybrid vehicle with an internal combustion engine and an electric motor combined; and a fault detection method for an exhaust gas recirculation system of an internal combustion engine used for the hybrid vehicle, in which an appropriate number of times of fault detection for an EGR system can be performed without motive power deteriorating and the energy drain on the battery can be suppressed.

In order to solve the above-described problems and achieve the above-described objects, the hybrid vehicle and the fault detection method for an exhaust gas recirculation system of an internal combustion engine according to the aspects of the invention are configured as follows.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a diagram schematically illustrating a configuration of a hybrid vehicle according to an embodiment of the invention in which an internal combustion engine and an electric motor are used as a source of motive power;

FIG. 2 is a diagram illustrating a configuration of an EGR system incorporated into the same hybrid vehicle;

DETAILED DESCRIPTION OF THE INVENTION

Figure 3:
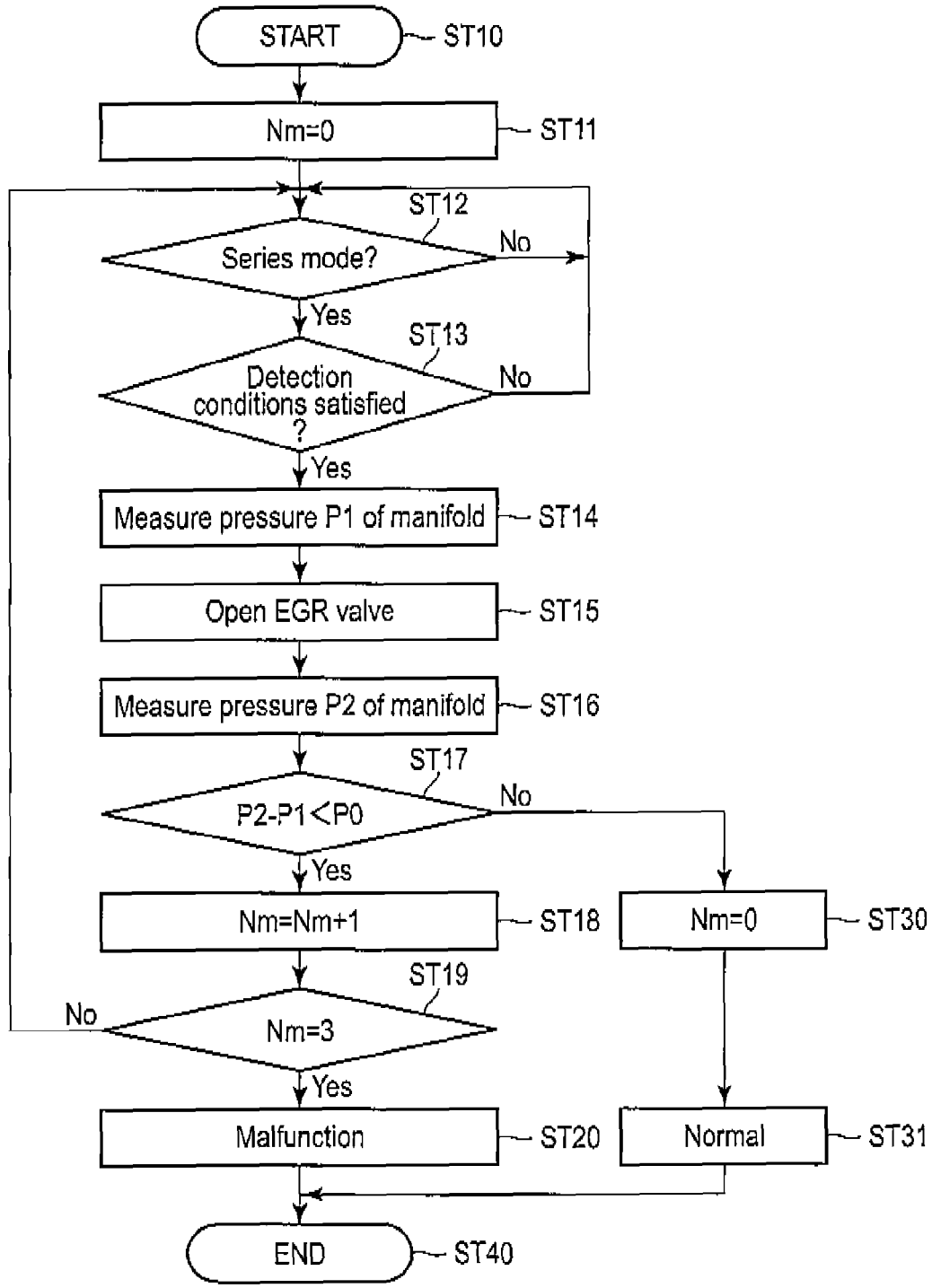
FIG. 3 is a diagram illustrating flows of fault detection of the same EGR system.
Figure 4:
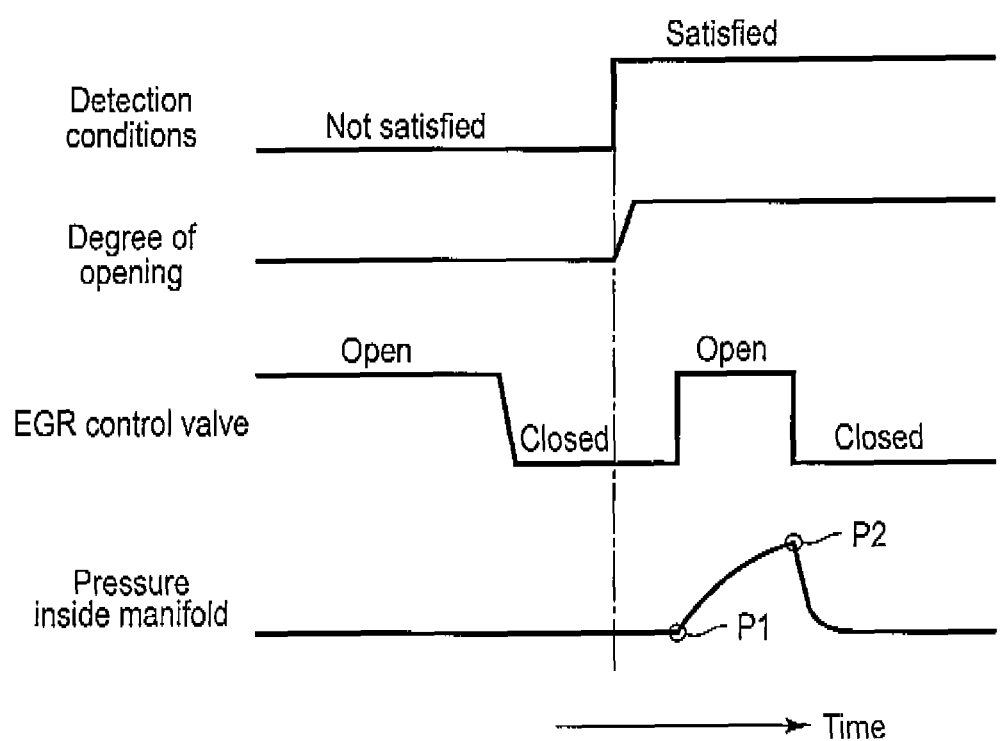
FIG. 4 is a timing chart for fault detection of the same EGR system.

FIG. 1 is a diagram schematically illustrating a configuration of a hybrid vehicle 10 according to an embodiment of the invention in which an internal combustion engine and an electric motor are used as a source of motive power (electric vehicle with an internal combustion engine combined). FIG. 2 is a diagram illustrating a configuration of an EGR system 27 incorporated into the same hybrid vehicle 10. FIG. 3 is a diagram illustrating process flow of fault detection of the EGR system 27 incorporated into the same hybrid vehicle 10. FIG. 4 is a timing chart for the same fault detection.

The hybrid vehicle 10 includes a vehicle body 11. In the vehicle body 11, an engine (internal combustion engine) 20, a front-wheel drive portion 30, a rear-wheel drive portion 40, a high-voltage battery (storage battery) 50, a fuel tank 60, an ECU (controller and fault detection control unit) 100 which controls the overall vehicle body, and the like are mounted.

The engine 20 includes an engine main body 21, an air cleaner 22 which introduces external air into the engine main body 21 and removes dust, a manifold (intake system) 23 which guides the external air from the air cleaner 22 to the engine main body 21, an exhaust pipe 24 which is connected to an exhaust side of the engine main body 21, a catalyst 25 which is provided halfway through the exhaust pipe 24, a muffler 26 which is provided in the vicinity of an outlet of the exhaust pipe 24, and an EGR system 27 which recirculates exhaust gas, located between the engine main body 21 and the catalyst 25, to the manifold 23.

The engine main body 21 is provided with an output shaft 21a to output motive force.

As illustrated in FIG. 2, a throttle valve 23a is arranged inside the manifold 23 and the degree of opening thereof is controlled by a signal output by the controller 100. The fuel supply is controlled by the degree of opening of the throttle valve 23a.

The EGR system 27 includes an EGR pipe 27a which is connected to the exhaust pipe 24, a pressure sensor (pressure measurement unit) 28 which measures the pressure inside the manifold 23, and an EGR valve 29 which is opened and closed according to an EGR signal output by the controller 100 and recirculates exhaust gas into the manifold 23.

The front-wheel drive portion 30 includes a power distribution integration mechanism 31 which is connected to the output shaft 21a, an electricity generator 32 which is connected to the output shaft of the power distribution integration mechanism 31 and produces electricity using the motive force of the engine 20, an inverter 33 which is connected to an output shaft of the electricity generator 32, a front-wheel motor (electric motor) 34 which is connected to an output shaft of the inverter 33 and an input shaft of the power distribution integration mechanism 31, a front driving axle 35 which is connected to an output shaft of the power distribution integration mechanism 31 and to which the motive force of the engine 20 or the front-wheel motor 34 is transmitted, and front wheels 36 which are connected to the front driving axle 35. In addition, the inverter 33 is connected to the high-voltage battery 50.

The power distribution integration mechanism 31 includes a speed reduction mechanism 31a and a clutch (motive force transmission unit) 31b which switches between the transmission and the non-transmission of power from the engine 20 to the front driving axle 35. When power is transmitted from the engine 20 to the front driving axle 35 through the clutch 31b, a parallel mode is selected. Accordingly, propulsion is effected by motive force output from the front-wheel motor 34, a rear-wheel motor 42 described below, and the engine 20. On the other hand, when power is cut off (is not transmitted) from the engine 20 to the front driving axle 35, a series mode is selected. Accordingly, propulsion is effected by motive force output from the front-wheel motor 34 and the rear-wheel motor 42 described below. In addition, EGR fault detection described below is performed in the series mode.

The rear-wheel drive portion 40 includes an inverter 41 which is connected to the high-voltage battery 50, the rear-wheel motor 42 which is connected to an output shaft of the inverter 41, a speed reduction mechanism 43 which is connected to an output shaft of the rear-wheel motor 42, a rear driving axle 44 which is connected to the speed reduction mechanism 43, and rear wheels 45 which are connected to the rear driving axle 44.

The ECU 100 has a function of controlling of propulsion, battery charging, EGR, EGR fault detection, and the like. The EGR fault detection is performed when the following detection conditions are satisfied. That is, the detection is performed when conditions, where the propulsion mode of the hybrid vehicle 10 is selected to the series mode (power is cut off from the engine 20 to the front driving axle 35) and the degree of opening of the throttle valve 23a is constant, are satisfied. To the detection start conditions, various conditions such as the water temperature of the engine main body 21, EC load, charging efficiency, torque load, and time elapsed from engine start, may be added. In addition, when the degree of opening of the throttle valve 23a is set such that the rate of revolution of the engine be maintained for the electricity generator 32 to produce electricity, fault detection can be performed while electricity is being produced.

As a timing for fault detection, the period of deceleration which satisfies the various above-described conditions is considered to be appropriate. As long as low-load propulsion is performed in the series mode, the EGR fault detection may be performed by making the degree of opening of the throttle valve 23a constant at an arbitrary time.

In the hybrid vehicle 10 configured as above, fault detection of the EGR system 27 is performed according to processes as illustrated in FIG. 3. FIG. 4 illustrates a timing chart thereof.

The hybrid vehicle 10 starts (ST10). As a result, a counter Nm is reset (ST11). Next, whether the series mode is selected or not is determined (ST12). If the series mode is not selected, the process returns to ST12. If the series mode is selected, whether the detection conditions for starting fault detection are satisfied or not is determined (ST13). If the detection conditions are not satisfied, the process returns to ST12.

When the detection conditions are satisfied, EGR fault detection processes start. First, a pressure P1 of the manifold 23 is measured (ST14). Next, the EGR valve 29 is opened to introduce exhaust gas into the manifold 23 (ST15). After a predetermined time, a pressure P2 of the manifold 23 is measured and the EGR valve 29 is closed (ST16). Then, whether the difference between pressure P1 and pressure P2 is less than a predetermined value P0 or not is determined (ST17). When the difference is less than predetermined value P0, it is determined that the EGR system 27 is not functioning and the counter Nm is increased by one (ST18). Next, whether the counter Nm is 3 or not is determined (ST19). If the counter Nm is not 3, the process returns to ST12. If the counter Nm is 3, it is determined that a fault has occurred (ST20), and the EGR fault detection processes end (ST40).

In ST17, when the difference between pressure P1 and pressure P2 is greater than or equal to predetermined value P0, the counter Nm is reset (ST30) and the EGR system is determined to be normal (ST17).

As described above, in the hybrid vehicle 10 according to the embodiment, fault detection is performed in a state where the engine 20 and the front wheels 36 are separated from each other. As a result, torque shock does not occur and motive power does not deteriorate. In addition, since fault detection is performed while making the degree of opening of the throttle valve 23a constant for fuel supply, the fault detection can be performed at an arbitrary time without the detection being stopped. As a result, an appropriate number of times of fault detection can be performed. Furthermore, since it is not necessary that the front-wheel motor 34 constrain the engine 20 to be rotated, a large energy drain on the high-voltage battery 50 is not imposed.

In the hybrid vehicle 10 according to the embodiment, fault detection can be performed while the electricity generator produces electricity.

In the above-described embodiment, the hybrid vehicle is used as an example, but vehicles other than automobiles such as a train may be used.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electric vehicle comprising: a drive shaft that is connected to a driving wheel;
   an internal combustion engine in which the amount of fuel supply is controlled by a throttle valve and that outputs power to the drive shaft;
   an electricity generator that produces electricity using the power of the internal combustion engine;
   a storage battery that accumulates the electricity produced by the electricity generator;
   an electric motor that is driven by electricity produced by the electricity generator or the storage battery and outputs power to the drive shaft;
   an exhaust gas supply unit that supplies exhaust gas, exhausted from the internal combustion engine, to an intake system of the internal combustion engine;
   a motive force transmission unit that switches between the transmission and the non-transmission of power from the internal combustion engine to the drive shaft;
   a pressure measurement unit that measures the change of an internal pressure of the intake system before and after the exhaust gas supply unit supplies the exhaust gas to the intake system; and
   a fault detection control unit that performs fault detection of the exhaust gas supply unit using the pressure measurement unit when conditions, where at least the motive force transmission unit does not transmit power to the drive shaft and the degree of opening of the throttle valve is constant, are satisfied.

2. The electric vehicle according to claim 1, wherein the degree of opening of the throttle valve is set such that at least the rate of revolution of the internal combustion engine be maintained for the electricity generator to produce electricity.

3. The electric vehicle according to claim 1,
   wherein the fault detection control unit performs the fault detection while power is not supplied from the storage battery to the electric generator.

4. A fault detection method for an exhaust gas recirculation system of an internal combustion engine used for an electric vehicle including an internal combustion engine in which the amount of fuel supply is controlled by a throttle valve and that outputs power to a drive shaft connected to a driving wheel, an electricity generator that produces electricity using the power of the internal combustion engine, a storage battery that accumulates the electricity produced by the electricity generator, an electric motor that is driven by electricity produced by the electricity generator or the storage battery and outputs power to the drive shaft, an exhaust gas supply unit that supplies exhaust gas, exhausted from the internal combustion engine, to an intake system of the internal combustion engine, a motive force transmission unit that switches between the transmission and the non-transmission of power from the internal combustion engine to the drive shaft, and a pressure measurement unit that measures the change of an internal pressure of the intake system before and after the exhaust gas supply unit supplies the exhaust gas to the intake system, the method comprising:
   determining whether conditions, where at least the motive force transmission unit does not transmit power to the drive shaft and the degree of opening of the throttle valve is constant, are satisfied or not; and
   performing fault detection of the exhaust gas supply unit using the pressure measurement unit when the conditions are satisfied in the determination.

* * * * *